United States Patent [19]

Deutschmann et al.

[11] Patent Number: 4,753,076
[45] Date of Patent: Jun. 28, 1988

[54] PISTON INTERNAL COMBUSTION ENGINE WITH TWO-STAGE SUPERCHARGING

[75] Inventors: Herbert Deutschmann, Friedrichshafen; Georg Ruetz, Immenstaad, both of Fed. Rep. of Germany

[73] Assignee: MTU Friedrichshafen GmbH, Fridrichshafen, Fed. Rep. of Germany

[21] Appl. No.: 21,677

[22] Filed: Mar. 4, 1987

[30] Foreign Application Priority Data

Mar. 8, 1986 [DE] Fed. Rep. of Germany ....... 3607698

[51] Int. Cl.⁴ ............................................. F02B 37/00
[52] U.S. Cl. .................................................... 60/612
[58] Field of Search ........................... 60/605, 611, 612

[56] References Cited

U.S. PATENT DOCUMENTS 4,570,442 2/1986 Deutschmann et al. ............. 60/612

FOREIGN PATENT DOCUMENTS 3512557 10/1985 Fed. Rep. of Germany ........ 60/611
82526 5/1984 Japan ..................................... 60/612

Primary Examiner—Michael Koczo
Attorney, Agent, or Firm—Barnes & Thornburg

[57] ABSTRACT

A piston internal combustion engine with two-stage supercharging in which two exhaust gas turbocharger groups consisting each of a high pressure and low pressure exhaust gas turbocharger, supply the piston internal combustion engine with charging air. One exhaust gas turbocharger group is constructed to be connected and disconnected, whereby a closure device is arranged in the exhaust gas line of the high pressure exhaust gas turbocharger and a check valve is arranged in the suction line of the low pressure exhaust gas turbocharger. For connecting and disconnecting the exhaust gas turbocharger group at partial load, the cross section of the closure devices is controlled. In order to avoid nonpermissive excess rotational speeds in the rotating parts of the high pressure exhaust gas turbocharger during a connecting operation, charging air is conducted back from the pressure side to the suction side by way of a controllable bypass line between the suction and pressure line of the high pressure compressor. The bypass line is controlled by a further closure device in dependence on the opening of the charging air closure device.

4 Claims, 1 Drawing Sheet

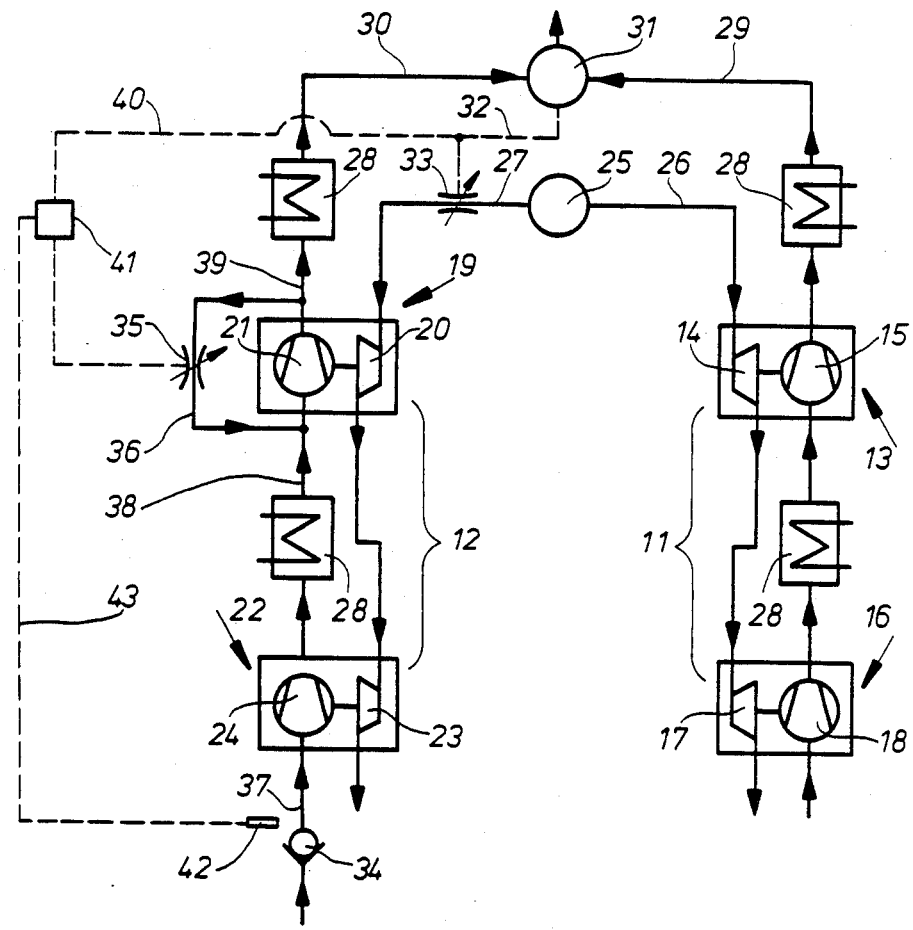

PISTON INTERNAL COMBUSTION ENGINE WITH TWO-STAGE SUPERCHARGING

The present invention relates to a piston internal combustion engine with two-stage supercharging by one or several exhaust gas turbocharger groups, each consisting of a high and of a low-pressure exhaust gas turbocharger, of which one or several exhaust gas turbocharger groups are constructed to be engaged and disengaged, whereby a closure device is arranged in the exhaust gas line of the high pressure exhaust gas turbocharger and a check valve is arranged in the suction line of the low pressure exhaust gas turbocharger and whereby the through-flow cross section of the closure device is controlled when connecting and disconnecting an exhaust gas turbocharger group at partial load of the engine.

The disengagement or disconnection of exhaust gas turbocharger groups is carried out in piston internal combustion engines for the increase of charging air pressure and charging air quantity at a yield of exhaust gas energy reduced compared to the full load operation, i.e., in the partial load and partial rotational speed range of the internal combustion engine. Only one exhaust gas turbocharger group thereby operates at low exhaust gas energy yield, with which one or several exhaust gas turbocharger groups are then gradually connected in parallel with an increase of the output power of the piston internal combustion engine until finally at full load operation all existing exhaust gas turbocharger groups operate.

A piston internal combustion engine of this type is disclosed in the DE-OS No. 34 11 408. During a connecting or engaging operation, each exhaust gas turbocharger of the exhaust gas turbocharger group to be connected into the system must reach its operating conditions corresponding to the conditions when being connected. The low pressure and high pressure compressors thereby participate each with a predetermined pressure increase in the production of the charging air pressure of an exhaust gas turbocharger group.

For thermodynamic reasons, the high pressure exhaust gas turbocharger of an exhaust gas turbocharger group has smaller dimensions and therefore also a smaller inertia moment than the associated low pressure exhaust gas turbocharger.

By reason of the smaller inertia moment, a greater rotary acceleration will result in the rotating parts of the high pressure exhaust gas turbocharger than in the low pressure exhaust gas turbocharger when connecting or engaging an exhaust gas turbocharger group. In the starting phase, after the connection of an exhaust gas turbocharger group, an asynchronism in the operating conditions of the low pressure and of the high pressure compressor will result therefrom. This is noticeable in that by reason of the more sluggish rotary acceleration in the low pressure exhaust gas turbocharger, the compressor thereof does not yet supply the pressure increase which the high pressure compressor requires for the operating point that corresponds to its already reached rotational speed. Initially the high pressure compressor can therefore convert only a portion of the driving power supplied by the high pressure turbine into delivery work. The excess power of the high pressure turbine which as a result thereof, is present during this phase causes the rotating parts of the high pressure exhaust gas turbocharger to reach for a short period of time a nonpermissive excess rotational speed when connecting or turning-on the corresponding exhaust gas turbocharger group.

It is therefore the object of the present invention to limit the rotational speed of the high pressure exhaust gas turbocharger to a permissive value during the acceleration after the initiation of a connection of the respective exhaust gas turbocharger group.

The underlying problems are solved according to the present invention in that a bypass line is arranged between the suction and pressure line of the high pressure compressor of an exhaust gas turbocharger group adapted to be disconnected and connected which includes a controllable closure device.

The advantages achieved with the present invention consist in particular in that the degree of the excess rotational speed which the high pressure exhaust gas turbocharger reaches when being connected, is limited to a value that causes no loads of the rotating parts which might endanger the operation of the high-pressure exhaust gas turbocharger.

The arrangement of a bypass line in conjunction with a connectable exhaust gas turborcharger group is disclosed in the DE-OS No. 34 11 408. The bypass line thereby connects the pressure line of the high pressure compressor with the suction line of the low pressure compressor. However, this arrangement has no rotational-speed-decreasing influence during the acceleration of the high pressure exhaust gas turbocharger.

These and other objects, features and advantages of the present invention will become more apparent from the following description when taken in connection with the accompanying drawing which shows, for purposes of illustration only, one embodiment in accordance with the present invention, and wherein:

The single FIGURE is a schematic view of a piston internal combustion engine with two-stage supercharging in accordance with the present invention.

Referring now to the drawing, the single figure illustrates two two-stage exhaust gas turbocharger groups 11 and 12 for a piston internal combustion engine (not shown). The exhaust gas turbocharger group 11 which is permanently connected, consists of a high pressure exhaust gas turbocharger generally designated by reference numeral 13 including a high pressure turbine 14 and a high pressure compressor 15 and of a low pressure exhaust gas turbocharger generally designated by reference numeral 16 including a low pressure turbine 17 and a low pressure compressor 18. The exhaust gas turbocharger group 12 which is adapted to be disconnected consists of a high pressure exhaust gas turbocharger generally designated by reference numeral 19 including a high pressure turbine 20 and a high pressure compressor 21 and of a low pressure exhaust gas turbocharger generally designated by reference numeral 22 including a low pressure turbine 23 and a low pressure compressor 24. The exhaust gas turbocharger groups 11 and 12 are supplied with exhaust gases from an exhaust manifold 25 by way of exhaust gas lines 26 and 27. They supply their charging air by way of charging air intercoolers 28, charging air lines 29, 30, 38 and 39 and by way of a charging air manifold 31 to the internal combustion engine (not shown).

At small load, the exhaust gas turbocharger group 12 is separated from the exhaust gas manifold 25 by an exhaust gas closure device 33 controlled by the charging air pressure in the charging air manifold 31, by way of a control line 32. A charging air closure device or check valve 34 in the suction line 37 prevents thereby the outflow of charging air out of the charging air manifold 31 by way of the exhaust gas turbocharger group 12.

On the pressure side of the high pressure compressor 21, a bypass line 36 controlled by way of a closure device 35 branches off from the charging air line 39 or also from the charging air line 30, which by-pass line 36 terminates on the suction side of the high pressure compressor 21 in the charging air line 38.

When with increasing power output of the piston internal combustion engine the upper power output limit of the permanently connected exhaust gas turbocharger group 11 is reached, then the exhaust gas closure device 33 is opened, controlled by the charging air pressure in the charging air manifold 31 by way of the control line 32. The exhaust gas turbocharger group 12 which had been disconnected up to then, is acted thereby upon with exhaust gases of the internal combustion engine.

The rotating parts of the high pressure exhaust gas turbocharger 19 are thereby accelerated more rapidly than the rotating parts of the low pressure exhaust gas turbocharger 22. This difference is due to the thermodynamically conditioned smaller dimensions and the smaller inertia moment of the high pressure exhaust gas turbocharger 19 resulting therefrom as compared to the low pressure exhaust gas turbocharger 22.

Simultaneously with the opening of the closure device 33, the closure device 35 controllably arranged in the bypass line 36 is also opened. The air volume which is sucked-off by the high pressure compressor 21 from the charging air line 38 within the acceleration phase of the turbocharger's rotating part, can flow back at least in part to the charging air line 38 by way of the bypass line 36. As a result thereof, a correct delivery flow will establish itself in the high pressure compressor 21 by way of the bypass line 36 independently of the operating condition of the low pressure compressor 24. The excess power available during this operating phase for the acceleration of the rotating parts of the high pressure exhaust gas turbocharger 19 is reduced by the input delivery power of the high pressure compressor 21. The maximum rotational speed which will establish itself as a result thereof in the high pressure exhaust gas turbocharger 19 during the acceleration, is considerably lower with an open bypass line 36 than would result with a closed bypass line 36. Loads and stresses in the rotating parts of the high pressure exhaust gas turbocharger 19 of the additionally connected exhaust gas turbocharger group 12 which would endanger the operation, are therewith precluded.

As soon as the low pressure exhaust gas turbocharger 22 has reached the rotational speed, at which the low pressure compressor 24 supplies the pressure condition necessary for the high pressure compressor 21, the bypass line 36 is closed by closing of the closure device 35.

The corresponding instant is reached when the charging air closure device 34 opens. The closing of the closure device 35 is initiated by a shifting device 41 arranged in the control line 40 which is influenced by a sensor 42 detecting the shifting condition of the charging air closure device 34 by way of the control line 43.

While we have shown and described only one embodiment in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

We claim:

1. A piston internal combustion engine with two-stage supercharging by several exhaust gas turbocharger groups consisting each of high and low pressure exhaust gas turbocharger means, at least one of said exhaust gas turbocharger groups being operable to be connected and disconnected in operation, a closure device for said at least one exhaust gas turbocharger group arranged in an exhaust gas line leading from the internal combustion engine to the high pressure exhaust gas turbocharger means and a check valve in the suction line leading to an inlet of the low pressure exhaust gas turbocharger means, means for controlling the closure device for purposes of connecting and disconnecting the at least one exhaust gas turbocharger group at partial load of the internal combustion engine, and bypass line means arranged between an outlet and an inlet of the high pressure compressor means of said at least one exhaust gas turbocharger group operable to bypass flow leaving the outlet to the inlet of said high pressure compressor of said at least one exhaust gas turbocharger group and including a controllable closure means in said bypass line means to control said bypass flow.

2. An internal combustion engine according to claim 1, wherein the controllable closure means is operatively connected by way of a control line with a sensor means detecting the shifting condition of the check valve in the suction line leading to the compressor of the low pressure turbocharger means of said at least one exhaust gas turbocharger group.

3. An internal combustion engine according to claim 1 wherein the bypass line means is responsive to said at least one exhaust gas turbocharger being connected in operation to bypass flow when the speed of the high pressure compressor is rapidly increased.

4. An internal combustion engine according to claim 2 wherein the bypass line means is responsive to said at least one exhaust gas turbocharger being connected in operation to bypass flow when the speed of the high pressure compressor is rapidly increased.

* * * * *